US006936681B1

(12) United States Patent
Wertz et al.

(10) Patent No.: US 6,936,681 B1
(45) Date of Patent: Aug. 30, 2005

(54) SLOW RELEASE NITROGEN FERTILIZER

(75) Inventors: Stacey L. Wertz, Conyers, GA (US); Kurt Gabrielson, Lilburn, GA (US); James Wright, Lithonia, GA (US); Paul Baxter, Conyers, GA (US); James Knight, Conyers, GA (US); C. R. Davis, Conyers, GA (US)

(73) Assignee: Georgia Pacific Resins, Inc., Atlanta, GA (US)

( * ) Notice: Subject to any disclaimer, the term of this patent is extended or adjusted under 35 U.S.C. 154(b) by 100 days.

(21) Appl. No.: 10/396,701

(22) Filed: Mar. 26, 2003

Related U.S. Application Data

(60) Provisional application No. 60/367,278, filed on Mar. 26, 2002, and provisional application No. 60/379,402, filed on May 13, 2002.

(51) Int. Cl.[7] .............................................. C08G 12/12
(52) U.S. Cl. ...................... 528/259; 528/266; 528/486; 528/491; 528/562 R; 528/562 E; 524/818; 524/839; 71/28
(58) Field of Search ................................ 528/259, 266, 528/486, 491, 502 R, 502 E; 524/818, 839; 71/28

(56) References Cited

U.S. PATENT DOCUMENTS

| | | |
|---|---|---|
| 2,648,609 A | 8/1953 | Wurster |
| 2,986,840 A | 6/1961 | Rogers |
| 2,999,336 A | 9/1961 | Cescas |
| 3,316,676 A | 5/1967 | Legal, Jr. et al. |
| 3,438,764 A | 4/1969 | Church |
| 3,598,565 A | 8/1971 | Graves |
| 3,621,612 A | 11/1971 | Porter |
| 3,677,736 A | 7/1972 | Formaini |
| 3,707,807 A | 1/1973 | Graves |
| 3,713,800 A | 1/1973 | Karnemaat |
| 3,808,740 A | 5/1974 | Porter et al. |
| 3,905,152 A | 9/1975 | Loperifido |
| 3,911,183 A | 10/1975 | Hinkes |
| 3,981,845 A | 9/1976 | Renner |
| 4,025,329 A | 5/1977 | Goertz |
| 4,058,067 A | 11/1977 | Wright et al. |
| 4,066,490 A | 1/1978 | Yoshimi |
| 4,089,899 A | 5/1978 | Greidinger et al. |
| 4,120,685 A | 10/1978 | Vargiu et al. |
| 4,174,957 A | 11/1979 | Webb et al. |
| 4,190,981 A | 3/1980 | Muldner |
| 4,192,095 A | 3/1980 | Haslam et al. |
| 4,219,966 A | 9/1980 | McCalister |
| 4,245,432 A | 1/1981 | Dannelly |
| 4,249,343 A | 2/1981 | Dannelly |
| 4,251,952 A | 2/1981 | Porter et al. |
| 4,280,830 A | 7/1981 | Ferguson et al. |

(Continued)

FOREIGN PATENT DOCUMENTS

| | | |
|---|---|---|
| DE | 43 08 505 A1 | 9/1994 |
| EP | 1 288 179 A1 | 5/2003 |
| GB | 2 229 350 A | 9/1990 |
| JP | 50 40321 | 4/1975 |
| JP | 3-22905 | 1/1991 |

OTHER PUBLICATIONS

International Search Report dated Aug. 8, 2003.
International Search Report dated Oct. 2, 2003.
Porter, F.E., Chemtech, May 1978, pp. 284–287.
Ros, C., et al., Seed Sci. & Technolo., 28: pp. 391–401.
J.E. Matocha, "*Effect of Seed Coating Protectants on Iron Deficiency Chlorosis and Sorghum Plant Growth*", Journal of Plant Nutrition, 15(10), 2007–2013 (1992).

*Primary Examiner*—Duc Truong
(74) *Attorney, Agent, or Firm*—Banner & Witcoff, Ltd.

(57) ABSTRACT

A slow release, particulate urea-formaldehyde polymer useful as a fertilizer for enhancing the extended delivery of nitrogen needed for plant development and growth and a granular fertilizer made with the particulate urea-formaldehyde polymer.

19 Claims, 2 Drawing Sheets

(1 of 2 Drawing Sheet(s) Filed in Color)

OTHER PUBLICATIONS

| | | |
|---|---|---|
| 4,298,512 A | 11/1981 | Sartoretto et al. |
| 4,333,265 A | 6/1982 | Arnold |
| 4,357,780 A | 11/1982 | Ball |
| 4,378,238 A | 3/1983 | Goertz |
| 4,409,015 A | 10/1983 | Grace, Jr. |
| 4,410,685 A | 10/1983 | Williams |
| 4,411,683 A | 10/1983 | Goertz |
| 4,429,075 A | 1/1984 | Carlson |
| 4,474,925 A | 10/1984 | Sartoretto et al. |
| 4,493,725 A | 1/1985 | Moon et al. |
| 4,501,851 A | 2/1985 | Williams |
| 4,526,606 A | 7/1985 | Formaini |
| 4,530,713 A | 7/1985 | Williams |
| 4,575,391 A | 3/1986 | DeBoodt et al. |
| 4,578,105 A | 3/1986 | Moore |
| 4,596,593 A | 6/1986 | Tazawa et al. |
| 4,735,015 A | 4/1988 | Schmolka |
| 4,735,017 A | 4/1988 | Gago et al. |
| 4,752,317 A | 6/1988 | Detroit |
| 4,753,035 A | 6/1988 | Ryan et al. |
| 4,756,738 A | 7/1988 | Detroit |
| 4,780,988 A | 11/1988 | Mielke et al. |
| 4,789,391 A | 12/1988 | Detroit |
| 4,832,728 A | 5/1989 | Allan et al. |
| 4,906,276 A | 3/1990 | Hughes |
| 4,960,856 A | 10/1990 | Formaini |
| 4,997,469 A | 3/1991 | Moore |
| 5,022,182 A | 6/1991 | Anderson |
| 5,039,328 A | 8/1991 | Saitoh et al. |
| 5,043,007 A | 8/1991 | Davis |
| 5,044,116 A | 9/1991 | Gago et al. |
| 5,106,648 A | 4/1992 | Williams |
| 5,110,898 A | 5/1992 | Formaini |
| 5,262,381 A | 11/1993 | Tusé et al. |
| 5,266,097 A | 11/1993 | Moore |
| 5,300,127 A | 4/1994 | Williams |
| 5,317,834 A | 6/1994 | Anderson |
| 5,344,471 A | 9/1994 | Tusé et al. |
| 5,443,637 A | 8/1995 | Long, Jr. et al. |
| 5,494,709 A | 2/1996 | Long, Jr. et al. |
| 5,501,720 A | 3/1996 | Buchholz |
| 5,618,330 A | 4/1997 | Artozon Sylvester |
| 5,640,803 A | 6/1997 | Kloepper et al. |
| 5,674,971 A | 10/1997 | Graves |
| 5,797,976 A | 8/1998 | Yamashita |
| 5,849,320 A | 12/1998 | Turnblad et al. |
| 5,860,245 A | 1/1999 | Welch |
| 5,935,839 A | 8/1999 | Kloepper et al. |
| 5,935,909 A | 8/1999 | Sanders |
| 6,009,663 A | 1/2000 | Kazemzadeh |
| 6,022,827 A | 2/2000 | Kumar et al. |
| 6,048,378 A | 4/2000 | Moore |
| 6,058,649 A | 5/2000 | Bittman et al. |
| 6,088,957 A | 7/2000 | Kazemzadeh |
| 6,202,346 B1 | 3/2001 | Lyons et al. |
| 6,209,259 B1 | 4/2001 | Madigan et al. |
| 6,230,438 B1 | 5/2001 | Zaychuk et al. |
| 6,306,194 B1 | 10/2001 | Wertz et al. |
| 6,309,440 B1 | 10/2001 | Yamashita |
| 6,318,023 B1 | 11/2001 | Yamashita |
| 6,432,156 B1 | 8/2002 | O'Donnell, Sr. |
| 6,464,746 B2 | 10/2002 | Neyman et al. |
| 6,515,177 B1 | 2/2003 | O'Donnell, Sr. |
| 2002/0103086 A1 | 8/2002 | Asrar et al. |
| 2002/0134012 A1 | 9/2002 | Ding et al. |
| 2002/0139046 A1 | 10/2002 | Weber et al. |
| 2003/0220200 A1 | 11/2003 | Wertz et al. |
| 2003/0228981 A1 | 12/2003 | Wertz et al. |
| 2004/0023809 A1 | 2/2004 | Wertz et al. |

SLOW RELEASE NITROGEN FERTILIZER

This application claims the benefit of provisional application 60/367,278 filed Mar. 26, 2002 and Provisional application 60/379,402 filed May 13, 2002.

FIELD OF THE INVENTION

The present invention relates to a new source of slow release nitrogen for enhancing the delivery of nitrogen needed for plant development and growth. The invention specifically relates to a new particulate source of slow release nitrogen, and to use of the particulate nitrogen source for enhancing plant development and growth, by delivering nutrient nitrogen over an extended period of time to growing plants. The present invention also is directed to the use of the particulate source of slow release nitrogen in formulating a granular fertilizer.

BACKGROUND OF THE INVENTION

Fertilizer is often applied as a formulated (N—P—K) solid, granular or powder, or sometimes as a liquid to an area to be fertilized. There are basically two types of fertilizers, water soluble fertilizers and "slow release" fertilizers. While water soluble fertilizers are generally less expensive than slow release fertilizers, they have the disadvantage of leaching nutrients very quickly into and through the soil. Some solid, water soluble fertilizers can be made slow release by various coatings. Alternatively, a reduction in nitrogen availability also can be obtained by using enzyme inhibitors. Slow release fertilizers are designed to release nutrients to plants or soil over an extended period of time, which is more efficient than multiple applications of water soluble fertilizers. Therefore, slow release fertilizers (also referred to as controlled release or extended release) minimize the frequency with which plants must be fertilized, as well as reduce or minimize leaching.

Urea-formaldehyde (UF) condensation products are widely used as slow release nitrogen fertilizers in crops, ornamental plants and grasses. Urea-formaldehyde fertilizer materials also can be supplied either as liquids or as solids and are the reaction products of urea and formaldehyde. Such materials generally contain at least 28% nitrogen, largely in an insoluble but slowly available form.

Extended release UF fertilizers (ureaform) can be prepared by reacting urea and formaldehyde at an elevated temperature in an alkaline solution to produce methylol ureas. The methylol ureas then are acidified to polymerize the methylol ureas to methylene ureas, which increase in chain length as the reaction is allowed to continue.

The methylene urea polymers that the condensation products normally contain have limited water solubility and thus release nitrogen throughout an extended period. The mixture of methylene urea polymers generally have a range of molecular weights and are understood to be degraded slowly by microbial action into water soluble nitrogen. UF fertilizers are usually evaluated by the amount and the release characteristics of their water insoluble nitrogen.

U.S. Pat. No. 4,089,899 describes a solid, controlled release nitrogen fertilizer of the ureaform type, which consists essentially of only two nitrogen fractions: water soluble nitrogen and cold water insoluble nitrogen.

U.S. Pat. No. 3,677,736 describes a urea-formaldehyde fertilizer suspension.

Other disclosures of urea-formaldehyde fertilizer compositions, both liquid and solid forms include U.S. Pat. Nos. 4,378,238, 4,554,005, 5,039,328, 5,266,097, 6,432,156, and 6,464,746.

Granular nitrogen-containing fertilizers have been produced commercially by a variety of techniques using water soluble nitrogen products, such as urea, potassium nitrate, and ammonium phosphate. The practical advantages of handling, blending, and storing such fertilizer granules are known and well documented. The preparation of granular fertilizers using slow release UF fertilizers also has been described in the prior art.

The present invention proposes to provide a new source of a particulate slow-release nitrogen (UF) as a plant fertilizer and to use such particles for forming granular fertilizer compositions.

BRIEF DESCRIPTION OF THE DRAWINGS

The patent or patent application file contains at least one drawing executed in color. Copies of this patent or patent application publication with color drawing(s) will be provided by the Office upon request and payment of the necessary fee.

DETAILED DESCRIPTION OF THE INVENTION

Figure 1:
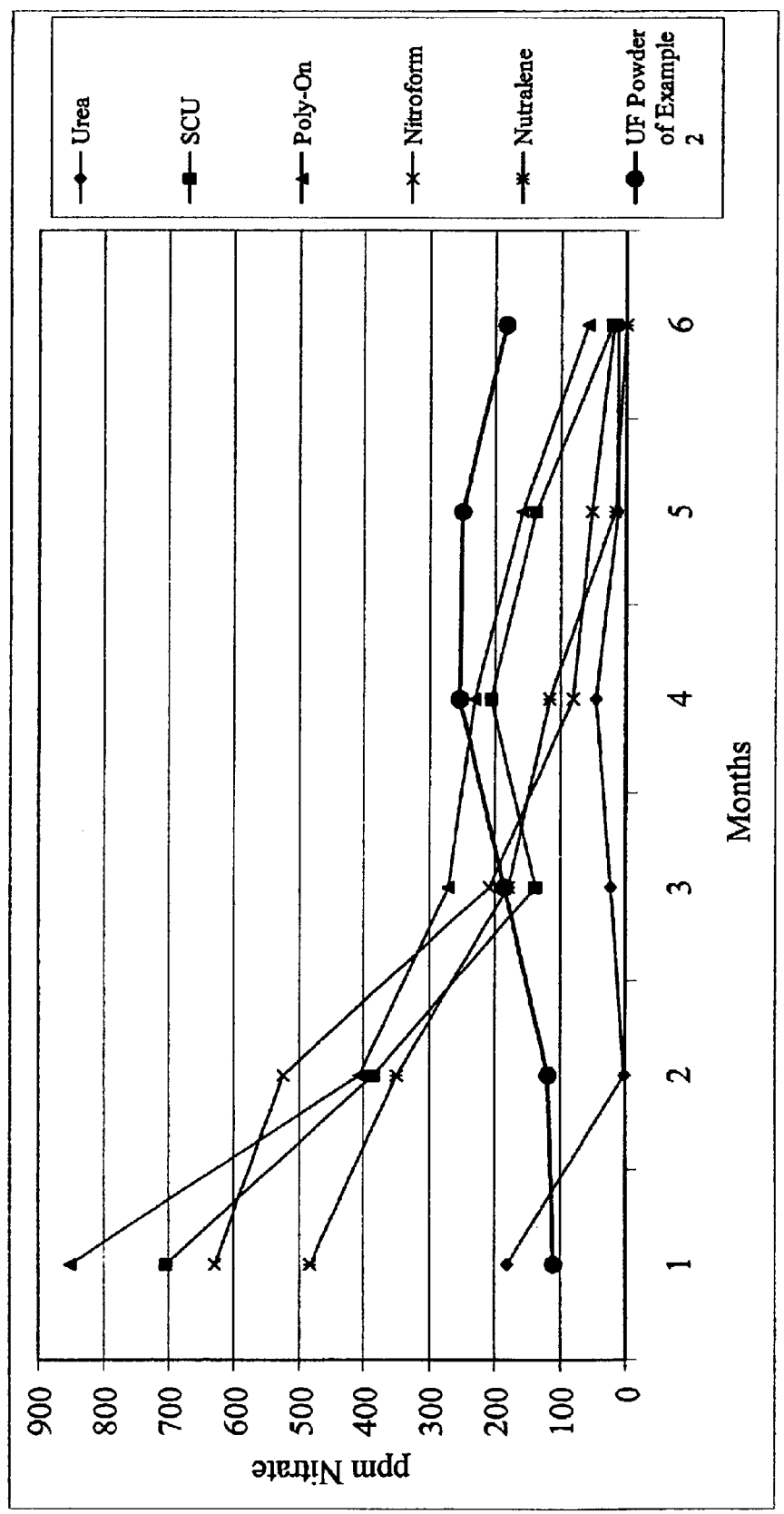
FIG. 1 is a graph showing the lysimeter results (nitrogen release rate) over a six (6) month time period for the UF polymer powder (particulate) of the present invention as compared with several commercially available sources of nitrogen fertilizers.
Figure 2:
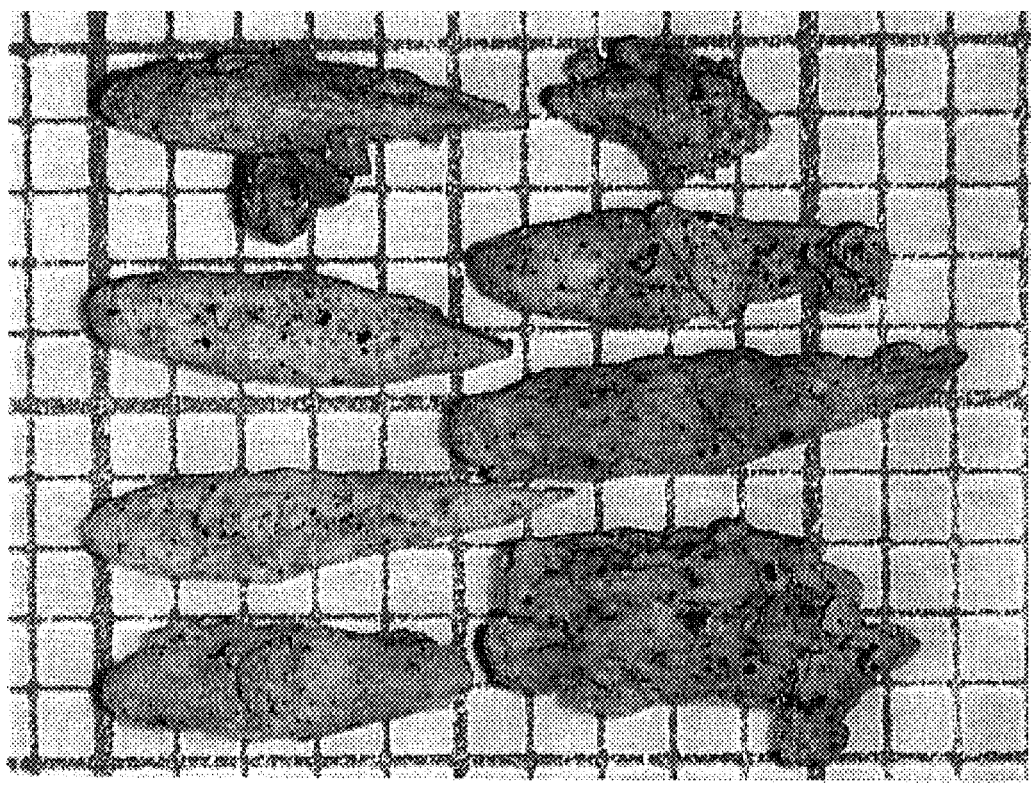
FIG. 2 is a photomicrograph of tall fescue seeds having an adherent coating containing slow release nitrogen particles in accordance with the present invention.

As noted above, the present invention is directed to a particulate source of slow release nitrogen (urea-formaldehyde (UF or ureaform) polymer particles) that is useful for enhancing the delivery of nitrogen needed for plant development and growth. The invention specifically relates to slow release nitrogen (UF) particles and to the use of the particles for enhancing plant development and growth. The slow release nitrogen particles of the present invention can be used in a variety of applications, for example they can be adhered to the surface of a seed, or on the surface of an aggregate material, such as sand, using an adhesive binder; they can used in preparing a granular fertilizer, they can be used as a root dip or in a soil drench; or they can be used as a soil additive. In yet another embodiment, the slow release nitrogen particles of the invention may have use in animal nutrition and could be used to coat urea, or another animal feed material.

Because of the slow release character of the nitrogen particle of the present invention, upwards of twenty times the amount of nitrogen fertilizer can be supplied in many fertilizer applications than would be possible using common quick release nitrogen fertilizers available in the prior art, such as urea or methylol ureas, without damaging seeds or growing plants (phytotoxic effect).

The slow release nitrogen UF polymer particles of the present invention are prepared by reacting, in an aqueous environment, urea and formaldehyde at a urea: formaldehyde mole ratio of about 1:1. Ammonia may be an optional reactant, as will be understood by those skilled in the art, in an amount of up to about 25% by weight of the formed UF polymer, usually in an amount below about 10% by weight, but in the preferred embodiment of the present invention ammonia is not used at all.

To prepare the UF polymer particles of the present invention, urea and formaldehyde are reacted in admixture at a mole ratio of approximately 1:1, for example at a UF mol ratio broadly in the range of $0.7:1 \leq U:F \leq 1.25:1$ and more preferably in the range of $0.83:1 \leq U:F \leq 1.1:1$. The phase "at a mole ratio of approximately 1:1" is intended to embrace these mole ratio ranges. Particularly good results have been obtained at a U:F mole ratio between 0.95:1 and 1.05:1.

In the initial step of preparing the UF polymer particles, reaction between urea and formaldehyde is conducted in a manner to produce methylol ureas. Methods of doing this are well known to those skilled in the art and any of such known methods can be used. For example, reaction between the urea and formaldehyde can be promoted by maintaining the aqueous mixture initially at a moderate alkaline pH, with a pH in the range of about 7 to 9 being suitable and with a pH more usually between about 7.5 and 8.5, to promote the formation of methylol ureas. Given urea's inherent level of alkalinity, any required pH adjustment may be accomplished using either an acid or a base. The initial formation of methyol ureas generally can be conducted at a reaction temperature broadly in the range of 70° F. to 175° F. (about 20° C. to about 80° C.), with a reaction temperature in the range of 90° F. to 160° F. (about 30° C. to about 70° C.) more usually employed. The pH may be adjusted using commonly available acids and bases such as sodium hydroxide (caustic) and sulfuric acid and any material that can alter the pH is suitable for this purpose. The reaction pH also may be maintained (buffered) or adjusted by adding such alkaline compounds as triethanolamine, sodium or potassium bicarbonate, sodium or potassium carbonate, or other alkali metal hydroxides, such as potassium hydroxide and lithium hydroxide. Alternatively (though not generally preferred), the methylolation may also be done at a moderate acidic pH, such as in the pH range of 5.0 to 6.0, as will be recognized by those skilled in the art and the present invention is not limited by the way the initial methylolation is conducted.

Following the initial formation of methylol ureas, the nascent UF polymer then is condensed to the point where the polymer becomes insoluble in the aqueous environment. This result is preferably accomplished by rapidly acidifying the methylol ureas, to a pH below about 6, preferably below about 5 and usually to a pH below about 4, but above about 1. A pH in the range of 2.5 to 4.0 has proven to be suitable. Any organic or inorganic acid that will lower the pH can be used. Particularly suitable is a strong acid, such as a mineral acid and an organic acid such as the stronger carboxylic acids. Thus, suitable acids include formic acid, acetic acid, nitric acid, phosphoric acid, sulfuric acid and hydrochloric acid. However, in its broadest aspects the present invention is not limited by the way the further polymerization of the methylol ureas and ultimate insolubilization is conducted and obtained.

In order to produce a useful range of UF polymer particle sizes, the aqueous mixture of the methylol ureas is preferably mixed in the presence of a dispersing agent during the step of rapid polymerization which leads to insolubilization, such as the rapid acidification step, although it should be possible to get a similar result by maintaining a sufficiently high level of agitation (high shear) during the reaction in the absence of any dispersing agent. The resulting dispersion of UF polymer particles formed from the polymerization that occurs, following acidification, can then be used directly (possibly following some thickening, or concentration enrichment), i.e., as a dispersion, to coat seed or sand, to treat roots, as a soil drench or soil additive, or to form a granular fertilizer, or alternately (and preferably) the dispersion of UF polymer particles can be recovered or isolated from the dispersion to produce a UF polymer powder, which then is used in any of the various applications noted above. The UF particulates formed in this manner have approximately 36% by weight nitrogen.

Particularly in the preferred embodiment, most of the nitrogen is chemically bound in the UF polymer particulates and thus is agronomically unavailable until microorganisms, principally bacteria, enzymatically (e.g., using urease and nitrogenase) degrade the polymer into a form useable by a growing plant. It is this property that leads to labeling the UF polymer particle "slow release" or "extended release." A small amount of the nitrogen, typically on the order of 5% by weight of the particulate, may be of the fast or quick release variety (e.g., principally unreacted urea) and thus may be immediately available to a seed or plant. Because the UF polymer has only about 5% quick release nitrogen, however, the chance of over fertilization using the particulate source of nitrogen of the present invention is minimal. However, if desired, the reaction conditions (including the mole ratio of reactants) and/or the extent of the reaction also can be adjusted such that a higher amount of free urea is present in/with the UF polymer particles, up to about 10% by weight, as a way to deliver more immediately available nitrogen for a quicker initial development or greening effect Such adjustments are well within the skill of the art in view of the present disclosure.

Skilled practitioners recognize that the formaldehyde and urea reactants used to make the UF polymer of this invention are commercially available in many forms. Any form of these materials, which can react with the other reactant and which does not introduce extraneous moieties deleterious to the desired reaction and reaction product, can be used in the preparation of the slow release nitrogen, urea-formaldehyde polymer particles of the invention.

Formaldehyde is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used sources of formaldehyde. Formaldehyde also may be available as a gas. Each of these sources of formaldehyde is suitable for use in the preparing the UF polymer of this invention. Generally, for ease of use, formalin solutions are preferred as the formaldehyde source. In addition, some of the formaldehyde may be replaced with another aldehyde, such as acetaldehyde and/or propylaldehyde that can react with urea. Glyoxal may also be used in place of formaldehyde, as may other aldehydes not specifically enumerated.

Urea also is available in many forms. Solid urea, such as prill, and urea solutions, typically aqueous solutions, are commercially available. Further, urea often is chemically combined with formaldehyde in the form of a urea-formaldehyde concentrate, such as UFC 85, or as a commercially-available solution containing about 25 weight percent urea, about 60 weight percent formaldehyde, and about 15 weight percent water, available under the trademark STA-FORM 60.® Each of these sources of urea can be used in preparing the UF polymer of this invention.

The urea-formaldehyde condensation reaction that results in the UF polymer particles of this invention is preferably conducted in an aqueous environment. As noted above, the reaction is conducted until the growing urea-formaldehyde polymer becomes insoluble in the aqueous reaction medium. A dispersing agent is preferably included in the water to facilitate the production of small polymer particles by the reaction. One suitable dispersant is the line of DAXAD dispersants commercially available from Hampshire Chemicals, a subsidiary of the Dow Chemical Company. One of the classes of these dispersants is a condensed naphthalene sulfonate. Both the high and low molecular weight species of this product line have been shown to be suitable, such as DAXDAD 19. A variety of other dispersants, or surfactants also can be used, including those that might be classified as anionic, such as polyacrylates (also available under the DAXAD label—such as DAXAD 30 from Hampshire Chemicals). Nonionic and cationic dispersant compounds also can be used. Suitable alternative materials can be identified using routine experimentation. The nature of the specific dispersant/surfactant is not critical. Another example would be a lignosulfonate salt or lignin. It is also possible to dispense with the use of any dispersant, provided that the reaction medium is sufficiently agitated (high shear) during the UF condensation reaction to promote the formation of small polymer particles.

The amount of dispersant to include in the aqueous solution of methylol urea at the time of the insolubilization reaction can be readily determined by those skilled in the art. The amount depends to some extent on the particular dispersant chosen to use and the concentration of methylol urea in the aqueous reaction medium. Generally, the urea and formaldehyde reactants and the water vehicle are provided in amounts to yield a methylol urea concentration that ultimately provides a dispersion of UF polymer particles at about a 20% by weight solid concentration up to about 60% by weight solids. More usually, the materials are provided so that the UF polymer dispersion is between about 30% and 55% by weight solids. Preferably, the dispersion of UF polymer particles is prepared at about a 40% by weight solids concentration. Under these conditions, the dispersing agent is generally supplied at a concentration of between about 0.1% and 5% by weight, and usually in at least about 0.5% by weight up to about 2% by weight.

The particle size of the UF polymer particulate material may vary fairly widely. In general, a particular size is dictated by the specific application for which the particle is too be used. In some applications, such as when used as a soil additive, the particle size is less critical than when it may be used for example in a seed coating where is likely would be desirable to have a particle size smaller than the seed itself and usually substantially smaller than the seed. Producing small UF particles helps one better obtain a necessary and desired degree of adhesion of the UF particles in such applications. By using the preferred method of making the UF polymer in the presence of a dispersant, it is easy to produce most of the UF particles sufficiently small so as to pass through a 100 mesh (U.S. or Tyler) screen, and generally at least a major portion also pass through a 200 mesh screen. Thus, most of the UF polymer particles will be smaller than about 150 microns and a large number of them may be smaller than about 75 microns. While there is virtually no lower limit to the UF polymer particle size for practicing the invention; as a practical matter, most particles will be larger than one micron. Most of the particles, prepared using the procedures and materials noted above, have a particle size in the range of 10 to 80 microns, with a number average particle size between about 25 and 35 microns. A number average particle size of about 30 microns is quite common.

In the broad practice of this invention, the aqueous dispersion of UF polymer particles can be used directly for the wide variety of available applications, such as coating seeds or coating sand, or the solid UF particles can be isolated from the dispersion before use. In some cases, it may be easier and more cost effective to use the dispersion directly. However, if there is a desire to isolate the particles, and that may be preferred in some applications, then according to the broadest aspects of the invention, any way for isolating the UF polymer particles from the aqueous UF polymer dispersion can be used. For example, the UF polymer particles in the dispersion may be isolated by filtration and oven drying, or by thin film evaporation. When using these latter techniques, it may then be necessary to reduce the particle size of the recovered solids, for example by grinding, to obtain a desired particle size or size distribution for a specific application.

Another, often preferred, way of isolating or recovering the UF polymer particles from the UF dispersion formed by the polymerization of urea and formaldehyde as described above, is by spray-drying. As used herein, the terms "spray dryer" and "spray drying" refer to the technically sophisticated process of atomizing (in the form of finely divided droplets) the UF dispersion or slurry into a gas stream (often a heated air stream) under controlled temperature conditions and under specific gas/liquid contacting conditions to effect evaporation of water from the atomized droplets and production of a dry particulate solid product. Spray drying as used herein is typically carried out with pressure nozzles (nozzle atomization) or centrifugal atomizers operating at high speeds (e.g., a spinning disc). Despite the high velocity generation of droplets, a spray dryer is designed so that the droplets do not contact the spray dryer wall under proper operating procedures. This effect is achieved by a precise balance of atomizer velocity, air flow, spray dryer dimensions of height and diameter, and inlet and outlet means to produce a cyclonic flow of gas, e.g., air in the chamber. A pulse atomizer also can be used to produce the small droplets needed to facilitate evaporation of the water. In some cases, it may be desirable to include a flow promoter, such as an aluminosilicate material, in the aqueous dispersion that is processed in a spray dryer simply to facilitate subsequent handling and transport of the spray dried UF powder (e.g., to avoid clumping).

In addition to the slow release nitrogen, UF polymer solid particles, a variety of other additives, including other agriculturally acceptable particulate materials, may also be combined with the UF polymer particles in the variety of potential applications. Some materials may exhibit a high degree of water solubility, and thus may be mixed with the UF polymer dispersion before its use. In fact, in some cases one may be able to mix such materials, especially the water soluble materials, with the UF polymer dispersion prior to spray-drying.

Included in materials that can be used in combination with the UF polymer particles are materials commonly used in fertilizer applications that are not toxic to seeds, or harmful to the soil environment in which seeds are planted, or in which a plant is growing. Such materials may include calcium carbonate (agricultural lime) in its various forms for adding weight and/or raising the pH of acid soils; metal containing compounds and minerals such as gypsum, metal silicates and chelates of various micronutrient metals such as iron, zinc and manganese; talc; elemental sulfur; activated carbon, which may act as a "safener" to protect against potentially harmful chemicals in the soil; pesticides, herbicides and fungicides to combat or prevent undesired insects, weeds and disease, super absorbent polymers, wicking agents, wetting agents, plant stimulants to accelerate growth, an inorganic (N—P—K) type fertilizer, sources of phosphorus, sources of potassium, and organic fertilizers, such as urea as a way to deliver more immediately available nitrogen for a quicker initial greening effect, surfactants, initiators, stabilizers, cross linkers, antioxidants, UV stabilizers, reducing agents, colorants and plasticizers. Mixtures of these different materials may of course also be employed. In a preferred embodiment, described in more detail hereafter, one or more of these materials is combined with the UF polymer particles of the invention to produce granular fertilizer solids.

Thus, in the broad practice of this invention, either the aqueous dispersion of slow release nitrogen particles itself, or more preferably the isolated, powdered UF polymer, slow release nitrogen, recovered from the aqueous dispersion, preferably by spray-drying, then is used in the desired application.

In one application, the UF polymer particles can be used to coat seeds or other solid aggregates using an adhesive. In the broad practice of this embodiment, the nature of the adhesive binder is not narrowly critical. Any non-toxic, biocompatible adhesive material should be suitable.

Based on these characteristics, adhesive classes which can potentially be used as the adhesive binder in the various applications include, but are not limited to, animal hide glues, celluloses including ethyl celluloses, methyl celluloses, hydroxymethyl celluloses, hydroxypropyl celluloses, hydroxymethyl propyl celluloses, carboxy methyl celluloses, polyvinyl alcohols and polyvinyl alcohol copolymers, dextrins, malto-dextrins, alginates, sugars, molasses, polyvinyl pyrrolidones, polyvinyl acetates and polyvinyl acetate copolymers, polysaccharides, fats, oils, proteins, gum arabics, shellacs, vinylidene chlorides, vinylidene chloride copolymers, lignosulfonates, starches, acrylate polymers and copolymers, such as polyvinyl acrylates, zeins, gelatins, chitosan, polyethylene oxide polymers, acrylamide polymers and copolymers, polyhydroxyethyl acrylates, methylacrylamide polymers, polychloroprenes, poly (methyl vinyl ether)-maleic anhydride copolymers, vinylpyrrolidone/styrene copolymers, vinyl acetate/butyl acrylate copolymers, styrene/acrylic ester copolymers, vinyl acetatelethylene copolymers and polyurethane polymers. Crosslinkable silicone materials as described in U.S. Pat. No. 4,753,035 also can be used. Still other materials, including natural inorganic materials such as silica gel and clay may also be suitable in some applications as will be readily apparent to those skilled in the art.

In a preferred embodiment of the invention, the UF polymer particles are used to prepare a composite fertilizer as granular particles. Granular particles can be prepared by commingling the UF polymer particles with one or more fertilizer enhancing solids. The fertilizer enhancing solids preferably contain a source of phosphorus and a source of potassium. The source of potassium may be potash (potassium chloride) or its sulfates, which are available commercially, such as the sulfate of potash ("SOP") or the sulfate of potash-magnesia ("SPM"). The source of phosphorus may be monoammonium phosphate ("MAP"), diammonium phosphate ("DAP"), or triple super phosphate ("TSP"), all of which are generally available from commercial sources. The amounts of nitrogen, phosphorus, and potassium included in the final fertilizer granules is not critical and typically will range from 0% to about 60% for each component. Most preferably, between about 1–100% slow-release nitrogen, 0–60% of a potassium source, and 0–60% of a phosphorus source are included in the final fertilizer granules.

In addition to phosphorus, and potassium, the fertilizer enhancing solids also preferably include other fertilizer components and/or nutrients (including materials previously identified) such as iron, manganese, calcium, micronutrients, and the like. The forms and sources of these additional components are known to persons skilled in the art, and the appropriate amounts may be selected to include in the fertilizer granules without undue experimentation. In this regard, the disclosure of U.S. Pat. No. 5,797,976, which provides an extensive list of fertilizer enhancing solids for enhancing the growth and development of plants, is herein incorporated by reference in its entirety for its disclosure.

To prepare the fertilizer granules, the UF polymer particles are combined with one or more of the fertilizer enhancing solids and a binder and then mixed to granulate the ingredients into more or less homogeneous granules. In many applications, as is well understood by those skilled in the art of granulation, plain water can be used as the binder simply by moistening the dry components to accomplish granulation. The water may be provided at ambient temperature, or it may be heated to provide additional energy for the granulation process. In some cases it may be preferred to provide the water as steam.

According to one process, the dry fertilizer ingredients, including the UF polymer particles, are combined and are mixed until a well-mixed blend of the ingredients is obtained. Fertilizer enhancing solids of an appropriate size for granulation, as is well-known to those skilled in the art of granulation, may be purchased from commercial sources, or they may be obtained by crushing or milling larger sized particles and screening for size. The dry ingredients can be blended by tumbling in a rotary mixer, although other methods of mixing may be used. For example, mixing in a paddle mixer or in a ribbon or other type of batch mixer may be preferred in certain cases.

After blending the ingredients to obtain a fairly uniform mixture, a binder is added to the mixture of particles, for example as noted above, the particles can simply be moistened, and then are further mixed to begin the granulation process. To obtain the granular fertilizer, one normally would employ a granulator that subjects the particles to a rolling action during the granulation. Such rolling-type granulators include dish-type granulators, drum-type granulators, or stirring-type (agitation-type) granulators in which stirring vanes or paddles rotate in a vessel. As recognized by those skilled in granulating solids, the blended particles can be moistened by spraying them with steam to heat the particles simultaneously during the moistening. Alternatively, the blended particles may be moistened with plain water, which may be sprayed onto the blend of particles. In yet another embodiment, a solution of an adhesive, such as a methylol urea solution, or a solution of one of the earlier identified agriculturally acceptable adhesives, is used as the binder (moisturizer). Any of these binders may be used alone, or in combination with others. Regardless of whether steam, water, or another binder is used, the moistening with the binder and the mixing preferably takes place in a tumbler or other mixer granulator so that the particles are evenly moistened.

As understood by skilled workers, the amount of binder/moisture added to the granules should be controlled; too little or too much binder being detrimental to final granule integrity. The temperature during granulation in not narrowly critical. The dry ingredients are mixed with binder until homogeneous particles of fertilizer granules, i.e., granules that contain most, if not all, of the fertilizer components, are obtained. In most cases, the fertilizer granules contain, in addition to the UF polymer particles of the present invention, a source of phosphorus, and a source of potassium. Those skilled in the art recognize that not all of the granules will contain the same ratio of all components, but it is preferred that the majority of the granules include each ingredient.

The desired particle size of the granules is generally dictated by the particular application of the resulting fertilizer. Granule particle sizes in the range of 20 mils to 250 mils (about 0.5 to about 6.0 mm) are typical. To obtain granules having a smaller particle size, one would typically initiate the granulation process using powder ingredients having a finer particle size. Particle size is controlled by properly adjusting the amount of binder and the rate of binder addition, the operating conditions of the granulator and the granulation time.

After granulation, the granules may be fed into a dryer to facilitate final production and recovery of the granulated fertilizer. For example, one might employ a rotating drum dryer with a drying zone temperature between 100° and 250° F. (about 40° to about 120° C.), usually between about 185° F. and 200° F. (between 85° C. and about 95° C.). After drying, the material is cooled to ambient temperature, and then is passed to a screening apparatus to separate granules meeting desired size specifications. Oversize granules and fines can be recycled to the granulation step, with oversize granules first being milled or crushed. Appropriately sized granules are recovered as the granulated fertilizer product.

According to this process a granular, slow-acting nitrogen fertilizer can be obtained, which is excellent in the physical properties for use as a fertilizer, having an acceptable hardness with minimal breakage.

The amount of UF polymer particles of the invention used in any particular application may vary fairly widely, but will usually depend on the particular application and its need for nitrogen fertilization, as well as the optional presence of other particulates and solids besides the essential UF polymer particles of the present invention.

The UF polymer particles of present invention, and the related fertilizer granules are useful for fertilizing a wide variety of seeds and plants, including seeds used to grow crops for human consumption, for silage, or for other agricultural uses. Indeed, virtually any seed or plant can be treated in accordance with the present invention using UF polymer particles of the present invention, such as cereals, vegetables, ornamentals, conifers, coffee, turf grasses, forages and fruits, including citrus. Plants that can be treated include grains such as barley, oats and corn, sunflower, sugar beets, rape, safflower, flax, canary grass, tomatoes, cotton seed, peanuts, soybean, wheat, rice, alfalfa, sorghum, bean, sugar cane, broccoli, cabbage and carrot.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

EXAMPLE 1

A urea-formaldehyde (UF) dispersion, suitable for producing UF polymer particles of the present invention, is prepared as follows. Water (32.3 parts by weight) and a 50% aqueous solution of formaldehyde (31.8 parts by weight) are added to a reaction vessel equipped with vacuum reflux, a heater and a mixer. While adjusting the temperature of the agitated aqueous mixture to 100° F., its pH is also adjusted to about 7.0 (6.8 to 7.2) using either 50% caustic (NaOH), or 35% sulfuric acid, as needed. Once the aqueous mixture has been heated to 100° F. (about 38° C.), 31.8 parts by weight of prilled urea also is added and mixing is continued. The temperature of the agitated aqueous mixture then is increased to 120° F. (about 50° C.) and held for a time (usually about 15 minutes) sufficient to dissolve the urea. While maintaining the temperature of the agitated mixture at 120° F. (about 50° C.), the pH is adjusted to within the range of 8.0 to 8.4, again using either 50% caustic (NaOH), or 35% sulfuric acid as needed. Using, as appropriate, a combination of the reaction exotherm and external heating, the reaction mixture is heated to a temperature of 158° F. and the temperature is controlled using vacuum reflux. The pH of the mixture is adjusted, as needed, to about 7.8 to 8.2, using either 50% caustic (NaOH), or 35% sulfuric acid. The agitated mixture is held at a temperature of about 158° F. (70° C.) for about 30 minutes and the pH continues to be adjusted, as needed, to about 7.8 to 8.2, using either 50% caustic (NaOH), or 35% sulfuric acid so that the reactants form methylol ureas. While continuing agitation, the aqueous mixture is cooled to about 105° F. (about 40° C.) and a dispersant (one part by weight of DAXAD 19) is added while the batch is cooled. Upon reaching 105° F. (about 40° C.), the batch is placed under full vacuum. While maintaining full vacuum and applying cooling to the agitated batch, the pH of the aqueous mixture is adjusted, as quickly as possible, to a pH of about 3.3 to 3.5, using 35% sulfuric acid, at which point the batch may exotherm to a temperature of above 175° F. (about 80° C.) before the exotherm subsides. This procedure causes rapid condensation of the methylol ureas to a solid network polymer. After completing the pH adjustment, the temperature of the aqueous mixture is cooled to 105° F. (about 40° C.) as quickly as possible while it is held for 20 minutes. Following the 20 minute holding period, the pH of the aqueous mixture is adjusted to 6.5 to 7.5, using either 50% caustic (NaOH), or 35% sulfuric acid, as needed, and then is discharged to storage. The UF polymer dispersion at about 38 weight percent solids should be agitated during its storage.

EXAMPLE 2

The dispersion made in accordance with Example 1 can then be spray dried to produce UF polymer particles. A Niro P6 spray dryer can be fed with 15 pounds per hour of the dispersion of Example 1. The spray dryer receives an inlet gas stream at a flow rate of about 415 standard cubic feet per minute and a temperature of 330–340° F. (165–170° C.). The outlet temperature of the spray dryer was measured as 75–95° F. (25–35° C.). The recovered UF polymer particle product (at about 1 wt. % moisture) had particle sizes distributed from 10 to 80 microns, with a number average size of 30 microns.

EXAMPLE 3

Using a Niro industrial-sized spray dryer (ON 030-5051), a UF polymer dispersion made in accordance with Example 1 having about a 38 wt. % solids content, at a temperature of 28° C. and at a feed rate of 100 lbs/minute was spray-dried with the atomizer wheel operating at 13,000 RPMs. Air, at a flow rate of 49,400 standard cubic feet per minute and at a temperature of 186° C. was delivered to the spray dryer. The outlet air temperature was measured as 88° C. Spray-dried UF polymer particles were recovered from the spray dryer.

EXAMPLE 4

In order to assess the release performance of the UF powder of the present invention, the sprayed dried UF powder product of Example 3 was tested in an incubation lysimeter, a procedure developed by Dr. Jerry Sartain of the University of Florida. An individual lysimeter is simply a 12 inch long piece of 3" diameter PVC piping. The pipe has a permanent cap on the bottom and a removable cap on the top. The bottom cap has an opening where water can drain and vacuum can be applied to remove excess water. A sand-soil mixture is prepared by mixing ninety-five (95) parts sand and five (5) parts topsoil. An amount of the sand-topsoil mixture sufficient to fill the column then is mixed thoroughly with an amount of each of the fertilizers to be tested sufficient to provide 450 mg of nitrogen in the column. After filling the lysimeter column, enough water is added to moisten the column contents. The column then is ready for the start of the testing. Once a month, 500 milliliters of 0.01 M citric acid is added to the column, allowed to flow downwardly through the column, and is collected from the bottom drain. Any excess water (citric acid) is removed from the column using a vacuum and combined with the amount collected from the drain. The collected liquid is analyzed for nitrogen (nitrate and ammonia) content. The amount of nitrogen (nitrate and ammonia) eluted from the column each month is determined. In addition to the UF powder of Example 6, sulfur coated urea (SCU), a polymer coated urea (Poly-On), a low molecular weight methylene urea (Nitroform) and an even lower molecular weight methylene urea (Nutralene) also were tested. Each material was tested in triplicate and the results of the testing are illustrated in the FIG. 1. The graph of FIG. 1 plots the total nitrate released each month (average of three replicates) over a six month period of time. As shown, the UF powder had the lowest level released in the first month and then sustained the highest levels of release in the fourth, fifth and sixth months. Furthermore, as shown by the release curve in FIG. 1, the release rate of nitrogen (as nitrate) from the UF polymer particles of the present invention is substantially uniform (constant) over a period of six months.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass +or −5%.

What is claimed is:

1. A particulate urea-formaldehyde polymer made by acidifying a aqueous methylol urea solution, wherein the aqueous methylol urea solution is made by reacting urea and formaldehyde at a urea:formaldehyde mole ratio of from 0.7:1 to 1.25:1 and wherein the aqueous methylol urea solution either contains a dispersing agent or is subjected to a high shear condition during the acidifying, to form an aqueous dispersion of insoluble urea-formaldehyde polymer particles and drying the dispersion to recover the urea-formaldehyde polymer particles.

2. The particulate urea-formaldehyde polymer of claim 1 wherein the aqueous methylol urea solution is made by reacting urea and formaldehyde at a urea:formaldehyde mole ratio of approximately 1:1.

3. The particulate urea-formaldehyde polymer of claim 1 wherein the aqueous methylol urea solution is made by reacting urea and formaldehyde at a urea:formaldehyde mole ratio of approximately 1:1 and wherein the methylol urea solution contains a dispersing agent during the acidifying.

4. The particulate urea-formaldehyde polymer of claim 2 wherein the aqueous methylol urea solution is made by reacting urea and formaldehyde at a urea:formaldehyde mole ratio of from 0.83:1 to 1.1:1.

5. The particulate urea-formaldehyde polymer of claim 3 wherein the aqueous methylol urea solution is made by reacting urea and formaldehyde at a urea:formaldehyde mole ratio of from 0.83:1 to 1.1:1.

6. The particulate urea-formaldehyde polymer of claim 1 wherein the aqueous methylol urea solution is made by reacting urea and formaldehyde at a urea:formaldehyde mole ratio of from 0.95:1 to 1.05:1 and wherein the methylol urea solution contains a dispersing agent during the acidifying.

7. The particulate urea-formaldehyde polymer of claim 1 wherein the aqueous methylol urea solution is made by reacting urea and formaldehyde at a urea:formaldehyde mole ratio of from 0.95:1 to 1.05:1.

8. The particulate urea-formaldehyde polymer of claim 1, 2, 3, 4, 5, 6, or 7 wherein the aqueous dispersion of urea-formaldehyde polymer particles is dried by spray drying.

9. A granular fertilizer made by granulating the particulate urea-formaldehyde polymer of claim 8 with a fertilizer-enhancing solid and a binder.

10. The granular fertilizer of claim 9 wherein said fertilizer-enhancing solid is selected from the group consisting of calcium carbonate; gypsum; metal silicates; metal chelates of a metal selected from iron, zinc and manganese; talc; elemental sulfur; activated carbon; pesticides; herbicides; fungicides; super absorbent polymers; wicking agents; wetting agents; plant stimulants; urea; a potassium source and a phosphorus source.

11. A method of producing a particulate urea-formaldehyde polymer comprising forming an aqueous solution of methylol urea by reacting urea and formaldehyde at a urea:formaldehyde mole ratio of 0.95:1 to 1.05:1; acidifying the aqueous methylol urea solution, wherein the aqueous methylol urea solution either contains a dispersing agent or is subjected to a high shear condition during the acidifying, to form an aqueous dispersion of insoluble urea-formaldehyde polymer particles and drying the dispersion to recover the urea-formaldehyde polymer particles.

12. The method of claim 11 wherein the wherein the methylol urea solution contains a dispersing agent during the acidifying and the aqueous dispersion of urea-formaldehyde polymer particles is dried by spray drying.

13. The particulate urea-formaldehyde polymer of claim 1 wherein the urea-formaldehyde polymer particles have a number average particle size between 25 and 35 microns.

14. A particulate urea-formaldehyde polymer made by acidifying an aqueous methylol urea solution, wherein the aqueous methylol urea solution is made by reacting urea and formaldehyde at a urea:formaldehyde mole ratio of from 0.7:1 to 1.25:1 and wherein the aqueous methylol urea solution either contains a dispersing agent or is subjected to a high shear condition during the acidifying, to form an aqueous dispersion of insoluble urea-formaldehyde polymer particles, wherein most of the urea-formaldehyde particles have a size between 1 and 150 microns.

15. The particulate urea-formaldehyde polymer of claim 14 wherein most of the urea-formaldehyde particles have a size between 10 and 80 microns.

16. The particulate urea-formaldehyde polymer of claim 15 wherein the urea-formaldehyde particles have a number average particle size between 25 and 35 microns.

17. The particulate urea-formaldehyde polymer of claim 14 wherein the dispersing agent is selected from the group consisting of a condensed naphthalene sulfonate, a polyacrylate, a lignosulfonate salt and lignin.

18. The particulate urea-formaldehyde polymer of claim 6 wherein the dispersing agent is selected from the group consisting of a condensed naphthalene sulfonate, a polyacrylate, a lignosulfonate salt and lignin.

19. The particulate urea-formaldehyde polymer of claim 12 wherein the dispersing agent is selected from the group consisting of a condensed naphthalene sulfonate, a polyacrylate, a lignosulfonate salt and lignin.

* * * * *

UNITED STATES PATENT AND TRADEMARK OFFICE
CERTIFICATE OF CORRECTION

PATENT NO. : 6,936,681 B1
DATED : August 30, 2005
INVENTOR(S) : Stacey L. Wertz et al.

It is certified that error appears in the above-identified patent and that said Letters Patent is hereby corrected as shown below:

Column 4,
Line 11, replace "nitrogenasc)" with -- nitrogenase) --.

Column 9,
Line 45, replace "omanmentals" with -- ornamentals --.

Signed and Sealed this

Twenty-first Day of February, 2006

JON W. DUDAS
*Director of the United States Patent and Trademark Office*